US011905142B2

(12) United States Patent
Roberts et al.

(10) Patent No.: US 11,905,142 B2
(45) Date of Patent: Feb. 20, 2024

(54) ELEVATOR SYSTEM CONTROL BASED ON BUILDING SWAY

(71) Applicant: OTIS ELEVATOR COMPANY, Farmington, CT (US)

(72) Inventors: Randy Roberts, Hebron, CT (US); George Scott Copeland, Wethersfield, CT (US); Luis C. Encinas Carreno, Farmington, CT (US); Patricia Derwinski, Farmington, CT (US); Cuauhtemoc Castro, Florence, SC (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/683,655

(22) Filed: Mar. 1, 2022

(65) Prior Publication Data

US 2022/0267118 A1 Aug. 25, 2022

Related U.S. Application Data

(63) Continuation of application No. 16/270,009, filed on Feb. 7, 2019, now Pat. No. 11,292,693.

(51) Int. Cl.
*B66B 5/00* (2006.01)
*B66B 5/02* (2006.01)
(Continued)

(52) U.S. Cl.
CPC ................ *B66B 5/022* (2013.01); *B66B 1/28* (2013.01); *B66B 1/3407* (2013.01); *B66B 1/3492* (2013.01)

(58) Field of Classification Search
CPC ......... B66B 5/022; B66B 5/02; B66B 1/3492; B66B 1/28; B66B 7/10; B66B 3/02; B66B 5/0018; B66B 5/0031; B66B 5/0006
See application file for complete search history.

(56) References Cited

U.S. PATENT DOCUMENTS 7,784,590 B2 8/2010 Watanabe et al.
8,297,412 B2 10/2012 Roberts et al.
(Continued)

FOREIGN PATENT DOCUMENTS

CN 101563285 A * 10/2009 ............... B66B 7/06
CN 202177637 U 3/2012
(Continued)

OTHER PUBLICATIONS

Extended European Search Report for Application No. EP 19 21 5773 dated Jul. 10, 2020.
(Continued)

*Primary Examiner* — Marlon T Fletcher
(74) *Attorney, Agent, or Firm* — Carlson, Gaskey & Olds, P.C.

(57) ABSTRACT

An illustrative example method of controlling an elevator situated in a hoistway of a building includes detecting sway of the building, determining characteristics of the detected sway including a plurality of frequencies and associated periods of the sway, determining an expected sway of an elongated member of the elevator system based on the determined characteristics, and controlling at least one of position and movement of an elevator car in the hoistway based on the expected sway.

21 Claims, 3 Drawing Sheets

(51) Int. Cl.
*B66B 1/28* (2006.01)
*B66B 1/34* (2006.01)

(56) References Cited

U.S. PATENT DOCUMENTS

| | | | | |
|---|---|---|---|---|
| 8,579,089 | B2 | 11/2013 | Hakala et al. | |
| 8,939,262 | B2 | 1/2015 | Schienda et al. | |
| 9,546,073 | B2 | 1/2017 | Roberts et al. | |
| 2010/0065381 | A1 | 3/2010 | Roberts et al. | |
| 2010/0213013 | A1 | 8/2010 | Urata | |
| 2013/0133983 | A1 | 5/2013 | Mangini et al. | |
| 2013/0173206 | A1* | 7/2013 | Benosman | B66B 7/06 702/141 |
| 2013/0121374 | A1 | 8/2013 | Halaka et al. | |
| 2013/0213742 | A1 | 8/2013 | Hakala et al. | |
| 2013/0275081 | A1* | 10/2013 | Benosman | B66B 7/06 703/1 |
| 2014/0069747 | A1* | 3/2014 | Benosman | B66B 7/06 187/414 |
| 2014/0124300 | A1* | 5/2014 | Benosman | B66B 7/06 187/247 |
| 2015/0008075 | A1* | 1/2015 | Benosman | B66B 7/06 187/247 |
| 2015/0027814 | A1 | 1/2015 | Benosman | |
| 2015/0166304 | A1 | 6/2015 | Roberts et al. | |
| 2017/0210597 | A1 | 7/2017 | Seki | |
| 2017/0260025 | A1 | 9/2017 | Benosman et al. | |
| 2017/0341904 | A1 | 11/2017 | Kitajima | |
| 2018/0016117 | A1 | 1/2018 | Palazoola et al. | |
| 2018/0106696 | A1 | 4/2018 | McClure et al. | |
| 2019/0177126 | A1* | 6/2019 | Murata | B66B 7/068 |
| 2019/0292015 | A1 | 9/2019 | Scoville et al. | |
| 2020/0239274 | A1* | 7/2020 | Gurvich | B66B 1/3476 |
| 2020/0239278 | A1 | 7/2020 | Murata | |
| 2020/0255260 | A1 | 8/2020 | Roberts et al. | |
| 2020/0299101 | A1 | 9/2020 | Puranen et al. | |
| 2020/0407191 | A1 | 12/2020 | Roberts | |
| 2021/0094793 | A1 | 4/2021 | Saito et al. | |
| 2021/0221645 | A1 | 7/2021 | Kwon | |
| 2021/0339982 | A1 | 11/2021 | Kwon et al. | |

FOREIGN PATENT DOCUMENTS

| | | | | | |
|---|---|---|---|---|---|
| CN | 103359570 | B | * | 9/2015 | |
| CN | 105293238 | A | | 2/2016 | |
| CN | 106573753 | B | * | 9/2019 | B66B 5/0031 |
| EP | 3693315 | A1 | * | 8/2020 | B66B 1/06 |
| FI | 123182 | B | * | 12/2012 | |
| JP | S61114982 | A | | 6/1986 | |
| JP | 2004250217 | A | * | 9/2004 | |
| JP | 2008044701 | A | | 2/2008 | |
| JP | 2009220995 | A | | 10/2009 | |
| JP | 2013500222 | A | * | 1/2013 | |
| JP | 2016108125 | A | | 6/2016 | |
| SG | 10201500516 | | * | 8/2015 | |
| WO | 2007/067491 | A2 | | 6/2007 | |
| WO | WO-2007099619 | A1 | * | 9/2007 | B66B 5/022 |
| WO | WO-2008079145 | A1 | * | 7/2008 | B66B 7/06 |
| WO | WO-2009116986 | A1 | * | 9/2009 | B66B 1/2416 |
| WO | WO-2012117479 | A1 | * | 9/2012 | B66B 5/0031 |
| WO | 2013/084154 | A2 | | 6/2013 | |
| WO | WO-2016018786 | A1 | * | 2/2016 | B66B 5/0031 |
| WO | WO-2020157822 | A1 | * | 8/2020 | B66B 1/44 |

OTHER PUBLICATIONS

Japanese Patent Application No. JP 2019-235617, Notice of Reasons for Rejection dated Dec. 7, 2021.

* cited by examiner

ELEVATOR SYSTEM CONTROL BASED ON BUILDING SWAY

CROSS REFERENCE TO RELATED APPLICATION

This application is a continuation of U.S. patent application Ser. No. 16/270,009, filed on Feb. 7, 2019.

BACKGROUND

Elevator systems are in widespread use for carrying passengers between various levels in buildings. Various factors affect elevator system operation at different times. For example, building sway conditions may introduce lateral movement of the roping of a traction-based elevator system. A variety of proposals have been made to control an elevator system in a way that should address such sway conditions.

One drawback associated with previous approaches is that the sensor devices that detect sway conditions tend to be expensive and provide limited information. Another issue associated with previous approaches is that they are not well-suited to address the more significant and potentially variable sway conditions that may be present in high rise and ultra-high rise buildings.

SUMMARY

An illustrative example method of controlling an elevator situated in a hoistway of a building includes detecting sway of the building, determining characteristics of the detected sway including a plurality of frequencies and associated periods of the sway, determining an expected sway of an elongated member of the elevator system based on the determined characteristics, and controlling at least one of position and movement of an elevator car in the hoistway based on the expected sway.

In an example embodiment having one or more features of the method of the previous paragraph, determining the characteristics comprises determining building sway movement along at least two axes.

In an example embodiment having one or more features of the method of either of the previous paragraphs, detecting the sway of the building comprises detecting the sway using a detector that provides an output indicating an amount of movement along each of at least two axes.

In an example embodiment having one or more features of the method of any of the previous paragraphs, the detector comprises a MEMs accelerometer.

In an example embodiment having one or more features of the method of any of the previous paragraphs, the building has a plurality of major axes, detecting the sway of the building comprises detecting movement along the major axes, respectively, and the determined characteristics include which of the major axes includes the detected sway.

An example embodiment having one or more features of the method of any of the previous paragraphs includes determining at least one critical zone in the hoistway based on the determined characteristics and controlling the at least one of position and movement of the elevator car is based on a location of the critical zone.

In an example embodiment having one or more features of the method of any of the previous paragraphs, determining the at least one critical zone comprises determining sway periods of the expected sway.

An example embodiment having one or more features of the method of any of the previous paragraphs includes determining a relationship between the characteristics of the sway of the building and a configuration of components of the elevator system and controlling the at least one of position and movement of the elevator car is based on the determined relationship.

In an example embodiment having one or more features of the method of any of the previous paragraphs, controlling the at least one of position and movement of the elevator car includes a first control strategy when the determined characteristics comprise a first set of characteristics or a second control strategy when the determined characteristics comprise a second set of characteristics. The first set of characteristics is different than the second set of characteristics and the first control strategy is different than the second control strategy.

An illustrative example control system for an elevator system in a hoistway of a building includes a controller configured to receive an indication of building sway and determine a plurality of characteristics of the detected sway including frequencies and corresponding periods of the sway. The controller determines an expected sway of at least one elongated member of the elevator system based on the characteristics. The controller controls at least one of position and movement of an elevator car in the hoistway based on the expected sway.

In an example embodiment having one or more features of the system of the previous paragraph, the characteristics include building sway movement along at least two axes.

An example embodiment having one or more features of the system of either of the previous paragraphs includes at least one detector that provides the indication of building sway and the at least one detector comprises a MEMs accelerometer.

In an example embodiment having one or more features of the system of any of the previous paragraphs, the building has a plurality of major axes, the detector is situated to detect building movement along the major axes, respectively, and the controller controls the at least one of position and movement of the elevator car based on which of the major axes includes the detected sway.

In an example embodiment having one or more features of the system of any of the previous paragraphs, the controller determines at least one critical zone in the hoistway based on the expected sway, and controls the at least one of position and movement of the elevator car based on a location of the critical zone.

In an example embodiment having one or more features of the system of any of the previous paragraphs, the controller determines the at least one critical zone by determining a plurality of periods of the expected sway.

In an example embodiment having one or more features of the system of any of the previous paragraphs, the controller determines a relationship between the characteristics of the detected sway of the building and an orientation of elevator system components in the hoistway. The controller controls the at least one of position and movement of the elevator car based on the determined relationship.

In an example embodiment having one or more features of the system of any of the previous paragraphs, the controller controls the at least one of position and movement of the elevator car using a first control strategy when a direction of the sway of the building is in a first direction or a second control strategy when the direction of the sway of the building is in a second direction. The first direction is different than the second direction and the first control strategy is different than the second control strategy.

The various features and advantages of an example embodiment will become apparent to those skilled in the art from the following detailed description. The drawings that accompany the detailed description can be briefly described as follows.

DETAILED DESCRIPTION

Figure 1:
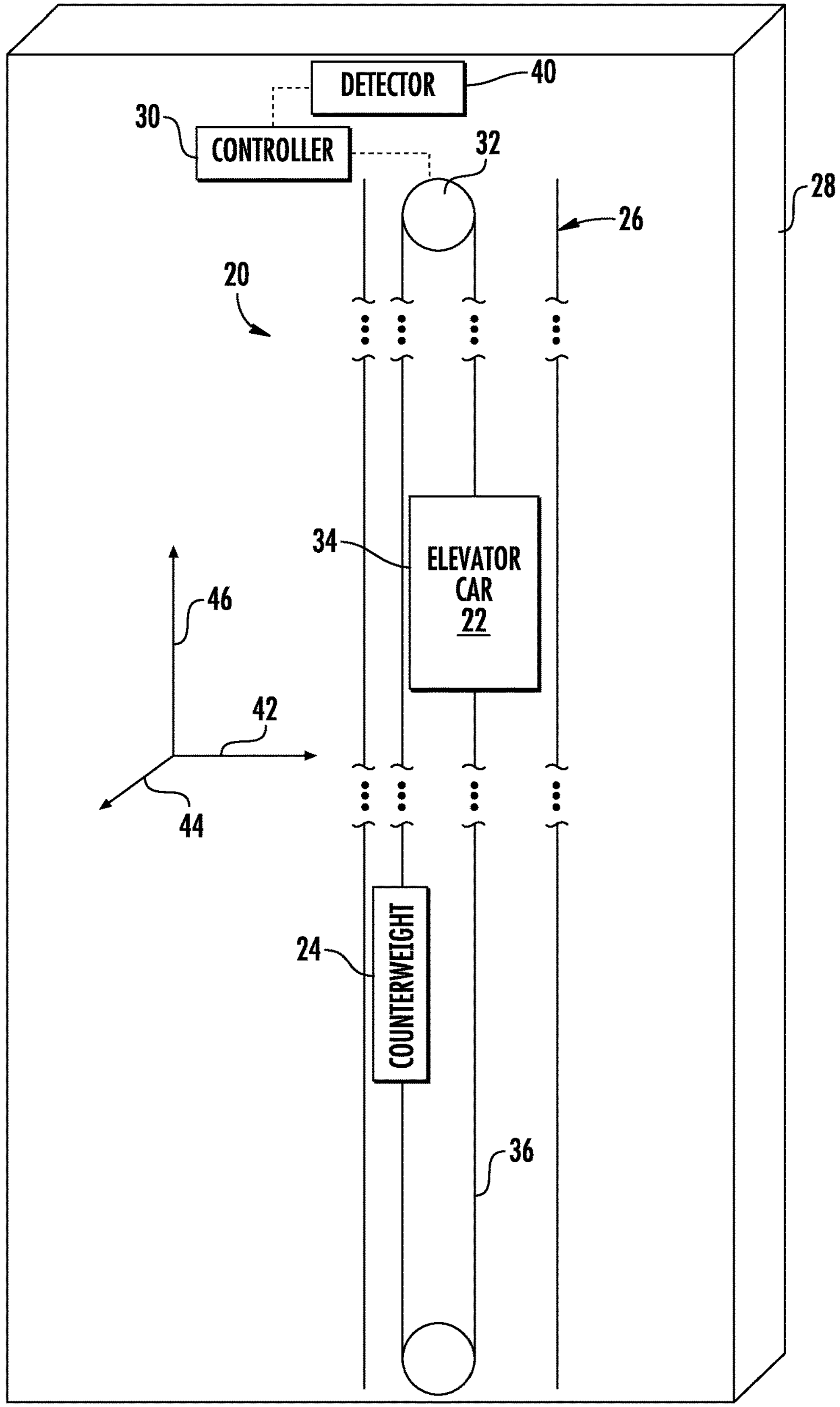
FIG. 1 schematically illustrates selected portions of an elevator system.

Selected portions of an elevator system 20 are schematically illustrated in FIG. 1. The elevator system 20 includes an elevator car 22 and counterweight 24 situated within a hoistway 26 of a building 28. The hoistway 26 may be situated in a variety of locations within the building 28, depending on the building configuration. In some instances, at least part of the hoistway 26 may be along an exterior surface of the building 28.

The example elevator system 20 is a traction-based system in which a controller 30 controls operation of a machine 32 to cause selected movement of a load-bearing roping assembly 34, which includes round ropes or flat belts for example. FIG. 1 also shows a compensation roping arrangement 36. The ropes or belts of the load-bearing roping assembly 34 and the ropes or belts of the compensation roping arrangement 36 are elongated members of the elevator system 20. Other known features and components of elevator systems are not shown. For example, a travelling cable is another type of elongated member that would be present in such a system.

At least one detector 40 is situated on or in the building 28 to detect sway of the building 28. The detector 40 is configured to detect movement of the building 28 along multiple axes, such as those schematically shown at 42, 44 and 46. In some embodiments, the detector 40 is situated to detect movement along the major axes of the building 28. Although a single detector 40 is illustrated for discussion purposes, some buildings 28 will include more than one detector.

The example detector 40 comprises an accelerometer. Some embodiments include a MEMs accelerometer. One feature of such a detector is that it is much less expensive than pendulum-type sway detectors. Additionally, the small size of the detector 40 allows it to be more easily incorporated into a variety of locations within a building or a hoistway.

The detector 40 provides an indication of building movement to the controller 30. The detector 40 provides an indication of an amplitude of the movement, a frequency of the movement and a direction of the movement. In some examples, any movement along each of the three axes 42, 44 and 46 is included with each indication from the detector 40 provided to the controller 30.

The indications from the detector 40 provide the controller 30 with information regarding sway of the building 28. The controller 30 includes a processor or other computing device and memory and is configured to utilize information from the detector 40 for determining characteristics of the sway of the building 28. The controlling at least one of position and movement of the elevator system 20. In most examples, the controller 30 utilizes position or movement information regarding the elevator car 22 for such control. The controller 30 is configured to use information regarding characteristics of the detected sway of the building 28 to select an appropriate control strategy for controlling the position or movement of the elevator. Different building sway conditions will have different effects on the components of the elevator system 20 and, in particular, the elongated members. The controller 30 utilizes information regarding the characteristics of the sway to address the corresponding expected effects on the elevator system 20.

Figure 2:
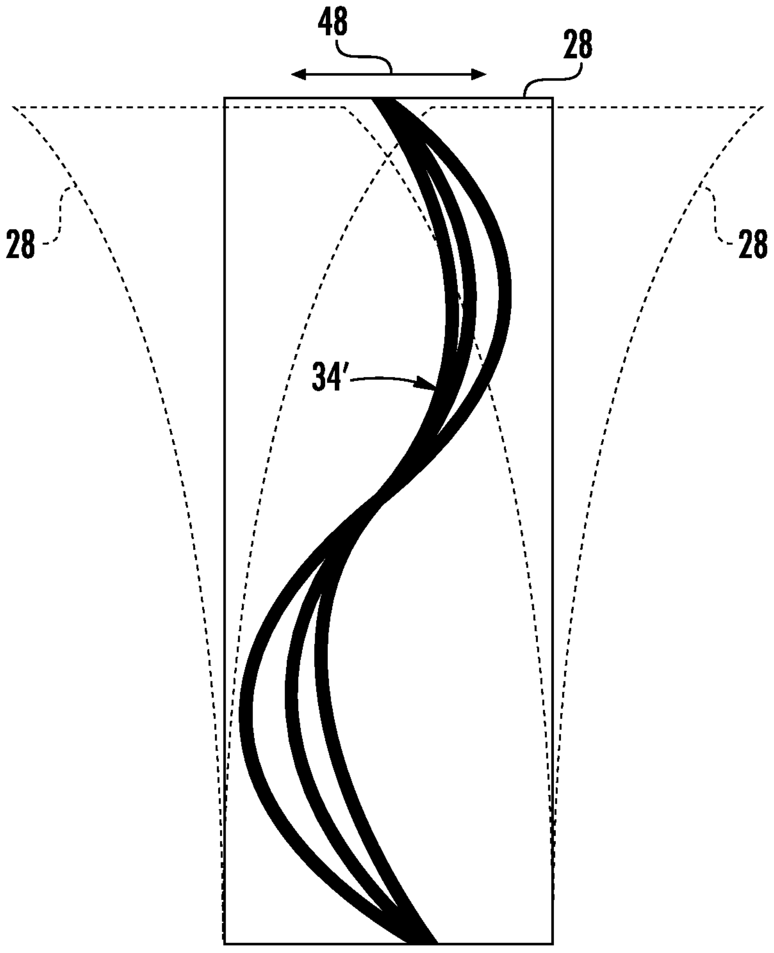
FIG. 2 is schematically shows an example building sway condition.

FIG. 2 schematically illustrates a building sway condition in which at least a portion of the building 28 is moving from side to side (according to the drawing) as indicated by the arrows 48. In this example, the building sway includes a portion of the building moving along at least one of the axes 42 and 44 (shown in FIG. 1). The design or static position of the building 28 is shown in solid lines while the sway conditions are shown in broken lines in FIG. 2. Such building sway has an impact on elevator system components. For discussion purposes, the load bearing roping assembly 34 will be considered as an example elongated member in the elevator system 20 that tends to move from a truly vertical or design position. Building sway tends to cause those elongated members to sway, which is schematically shown by three example positions of an elongated member at 34' in FIG. 2. The elongated members of the roping assembly 34 will move with the building 28 into other positions that are not illustrated in FIG. 2 for simplicity. The controller 30 addresses such conditions by controlling the position, movement or both of at least the elevator car 22 within the hoistway 26 to avoid damage to any elevator system components, for example.

Figure 3:
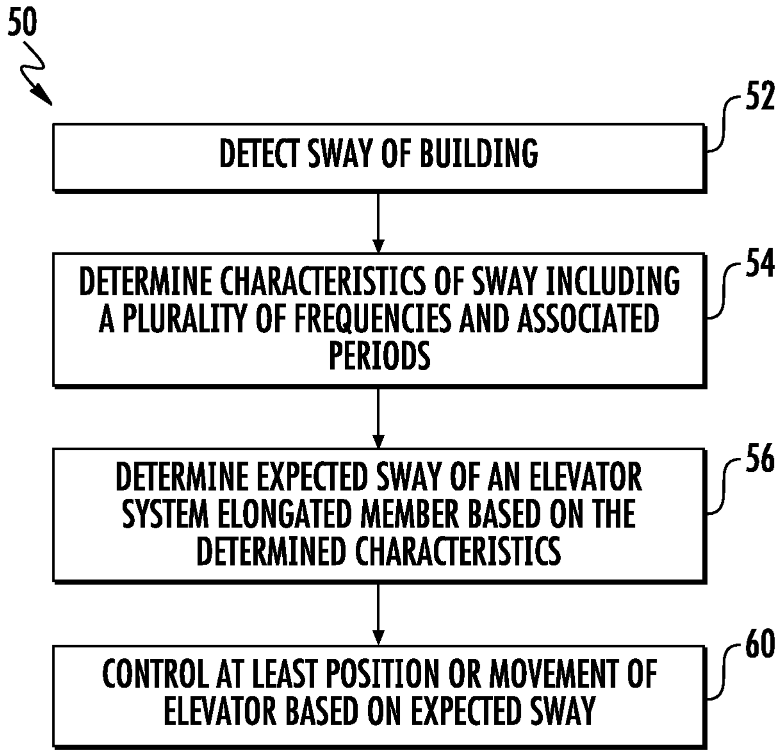
FIG. 3 is a flow chart diagram summarizing an example control technique based on a building sway condition.

FIG. 3 includes a flowchart diagram 50 that summarizes an example control approach. At 52, the detector 40 detects sway of the building. The detector 40 provides an indication of movement along at least the two axes 42 and 44 to the controller 30. At 54, the controller determines characteristics of the sway of the building that correspond to the time varying oscillations of the building. The determined characteristics include a plurality of frequencies and corresponding periods (i.e., period=1/frequency) of the sway. The frequency and period information used in embodiments like the illustrated example allows for improved control of the elevator system 20. The determined characteristics also include an amplitude and direction of the sway of the building.

When determining the characteristics of the sway of the building 28, the controller 30 identifies the potential existence of multiple tones in the sway in any single axes. In this example, the "cantilever" modes in the building 28 are of concern and there will generally be two frequencies. The detector 40 is likely not perfectly aligned with the major axes of the building 28 and in each channel there will likely be at least two frequencies.

Part of determining the characteristics of the sway of the building 28 in the example embodiment includes Digital Signal Processing logic. The raw acceleration data along each axis provided by the detector 40 is filtered using a bandpass filter to isolate building motion in the frequency range of interest for building sway detection. An example frequency range is 0.05-1.00 Hz frequency, which has corresponding periods from 1-20 seconds. Such a frequency range avoids being sensitive to high frequency vibration inputs from mechanical components in the building 28, such as the elevator machine 32. This example includes using a moving running average of the sensed accelerations in the two axes to smooth vibrations and to ensure detected building sway conditions are not just one-time or isolated events but are persistent enough to present concerns with sway of the elongated members of the elevator system 20.

At 56, the controller 30 determines an expected sway of the elongated members based on the characteristics of the sway of the building 28. Given information regarding the building design and building sway modes and information regarding the configuration or features of the elevator system components, it is possible to establish relationships between sets of characteristics of the sway of the building 28 and resulting sway of the elevator system elongated members. Some example embodiments include predetermining such relationships using known analytical techniques. The controller 30 uses such relationships to determine expected sway of the elongated members of the elevator system 20.

The expected sways of the elongated members for various sets of characteristics will have multiple frequencies, respectively. The frequencies and corresponding periods of the currently expected sway provide information regarding how the elevator system should be controlled to avoid certain types of elongated member sway. For example, it is desirable to determine which arrangements or conditions of the elevator system components are likely to result in elongated member sway at or near a resonant frequency. The controller 30 uses a control strategy determined based on the expected elongated member sway to avoid such sway conditions.

One example way to avoid such sway conditions includes identifying at least one critical zone within the hoistway 26. A critical zone may be, for example, a portion of the hoistway 26 where the elevator car 22 should not be situated during the sway condition because the corresponding configuration of the load bearing roping assembly 34 or compensation roping assembly 36 may allow the elongated members to experience significant lateral movement within the hoistway 26, which should be avoided. A critical zone may include a parking position for the elevator car 22 that puts the natural sway frequency of the elongated members within 10% of one of the known building sway frequencies. With the elevator car 22 in such locations, the elongated member sway is nearly resonant with the building sway.

The control strategy determined by the controller 30 may include controlling at least one of the position and movement of the elevator car 22 to avoid spending any significant time at or near an identified critical zone during sway events so as to minimize rope sway.

In some embodiments, the controller 30 determines a control strategy from a plurality of possible control strategies based on the determined characteristics of the building sway. For example, the controller 30 has information within memory regarding different relationships between elevator system features and different sets of building sway characteristics. The controller 30 is configured to use such relationships for selecting appropriate control strategy features to ensure a desired elevator system condition or performance during the sway conditions. For example, if the sway involves building movement in a side-to-side or lateral direction relative to the hoistway 26 and the elevator system components in that hoistway, that type of sway will tend to have a different effect than sway in a fore-aft or back-and-forth direction relative to the hoistway 26. With the information regarding the direction of building sway, the controller 30 is able to determine the appropriate control strategy for that sway condition.

The building will experience different types or amounts of sway in different directions. Wind patterns, for example, will be different depending on the location and orientation of the building 28. The direction information from the detector is associated with predetermined expected sway behavior in some embodiments.

In some examples, the detector 40 detects building movement along at least one of the major axes of the building. The control strategy selected by the controller 30 depends, at least in part, on the axis or axes along which the building movement occurs. The building sway period tends to vary depending on the direction of building movement and which of the building axes such movement is along. The controller 30 in the illustrated example is configured to utilize such information for selecting an appropriate control strategy.

The information that the controller 30 has regarding different building sway conditions may be predetermined or determined empirically over time. The effects of the different types of sway or different characteristics of sway on the elevator system 20 and its components may also be predetermined or established empirically over time. The manner in which that information is determined is outside the scope of this disclosure.

At 60, the controller 30 controls at least one of the position or movement of the elevator using the determined control strategy to address the sway conditions indicated by the detector 40.

Elevator system control consistent with the disclosed example embodiment provides more specific and effective control over the position, movement or both of the elevator based upon characteristics of a sway condition. Such response to particular characteristics of building sway, such as the period and direction, improves the ability to maintain a desired condition of elevator system components and achieve a desired elevator system performance.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of controlling an elevator system situated in a hoistway of a building, the method comprising:

detecting sway of the building;

determining characteristics of the detected sway including a plurality of building sway frequencies and associated periods of the sway of the building, wherein determining the characteristics comprises determining an indication of an amplitude of movement, a frequency of the movement, and a direction of the movement;

determining a relationship between the characteristics of the sway of the building and a configuration of components of the elevator system;

determining an expected sway of an elongated member of the elevator system based on the determined characteristics; and controlling at least one of position and movement of an elevator car in the hoistway based on the expected sway of the elongated member and based on the determined relationship including using a first control strategy when the determined characteristics comprise a first set of characteristics or a second control strategy when the determined characteristics comprise a second set of characteristics, wherein the first set of characteristics is different than the second set of characteristics and the first control strategy is different than the second control strategy, and wherein the direction comprises at least a side-to-side direction relative to the hoistway or a fore-aft direction relative to the hoistway, and wherein the first control strategy is used for the side-to-side direction and the second control strategy is used for the fore-aft direction.

2. The method of claim 1, wherein determining the characteristics comprises determining sway movement along at least two axes.

3. The method of claim 2, wherein detecting the sway of the building comprises detecting the sway using a detector that provides an output indicating an amount of movement along each of the at least two axes.

4. The method of claim 3, wherein the detector comprises a MEMs accelerometer.

5. The method of claim 1, wherein:

the building has a plurality of major axes;

detecting the sway of the building comprises detecting movement along the major axes, respectively; and the determined characteristics include which of the major axes includes the detected sway.

6. The method of claim 1, comprising determining at least one critical zone in the hoistway based on the determined characteristics and wherein controlling the at least one of position and movement of the elevator car is based on a location of the critical zone.

7. The method of claim 6, wherein determining the at least one critical zone comprises determining sway frequencies, periods or both of the expected sway.

8. The method of claim 1, wherein, when determining the characteristics of the sway of the building, any existence of multiple tones in the sway is identified in any single axes.

9. The method of claim 1, wherein determining the characteristics of the sway of the building includes isolating building motion in a frequency range of interest for building sway detection.

10. The method of claim 9, wherein the frequency range of interest is 0.05-1.00 Hz.

11. A control system for an elevator system in a hoistway of a building, the control system comprising:

at least one detector to determine a plurality of characteristics of building sway, wherein the at least one detector provides an indication of an amplitude of movement, a frequency of the movement, and a direction of the movement; and a controller configured to receive an indication of building sway, determine the plurality of characteristics of the building sway comprising frequencies and corresponding periods of building sway, determine a relationship between the characteristics of detected sway of the building and a configuration of elevator system components in the hoistway, determine an expected sway of at least one elongated member of the elevator system based on the characteristics, and control at least one of position and movement of the elevator in the hoistway based on the expected sway of the at least one elongated member and the determined relationship including using a first control strategy when the determined characteristics comprise a first set of characteristics or a second control strategy when the determined characteristics comprise a second set of characteristics, wherein the first set of characteristics is different than the second set of characteristics and the first control strategy is different than the second control strategy, and wherein the direction comprises at least a side-to-side direction relative to the hoistway or a fore-aft direction relative to the hoistway, and wherein the first control strategy is used for the side-to-side direction and the second control strategy is used for the fore-aft direction.

12. The system of claim 11, wherein the characteristics include building sway movement along at least two axes.

13. The system of claim 12, comprising at least one detector that provides the indication of building sway and wherein the at least one detector comprises a MEMs accelerometer.

14. The system of claim 11, wherein the building has a plurality of major axes;

a detector is situated to detect building movement along the major axes, respectively; and the controller controls the at least one of position and movement of the elevator based on which of the major axes includes the detected sway.

15. The system of claim 11, wherein the controller determines at least one critical zone in the hoistway based on the expected sway and controls the at least one of position and movement of the elevator based on a location of the critical zone.

16. The system of claim 15, wherein the controller determines the at least one critical zone by determining a plurality of sway frequencies, periods, or both of the expected sway.

17. The system of claim 11, wherein, when determining the characteristics of the detected sway of the building, any existence of multiple tones in the sway is identified for movement along any single axis.

18. The system of claim 11, wherein determining the characteristics of the detected sway of the building includes isolating building motion in a frequency range of interest for building sway detection.

19. The system of claim 18, wherein the frequency range of interest is 0.05-1.00 Hz.

20. A control system for an elevator system in a hoistway of a building, the control system comprising a controller configured to:

receive an indication of building sway;

determine a plurality of characteristics of the building sway including frequencies and corresponding periods of the sway of the building;

determine a relationship between the characteristics of detected sway of the building and a configuration of elevator system components in the hoistway;

determine an expected sway of at least one elongated member of the elevator system based on the characteristics; and control at least one of position and movement of the elevator in the hoistway based on the expected sway of the at least one elongated member and the determined relationship including using a first control strategy when the determined characteristics comprise a first set of characteristics or a second control strategy when the determined characteristics comprise a second set of characteristics, wherein the first set of characteristics is different than the second set of characteristics and the first control strategy is different than the second control strategy, wherein the components of the elevator system comprise at least elongated members of the elevator system, and wherein determining the relationship between the characteristics of the sway of the building and the configuration of the elongated members of the elevator system includes using information regarding building design and building sway modes, using information regarding the configuration or features of the elongated members, establishing relationships between sets of characteristics of the sway of the building and resulting sway of the elongated members, and determining the expected sway of the elongated members based on the relationships.

21. A method of controlling an elevator system situated in a hoistway of a building, the method comprising:

detecting sway of the building;

determining characteristics of the detected sway including a plurality of building sway frequencies and associated periods of the sway of the building;

determining a relationship between the characteristics of the sway of the building and a configuration of components of the elevator system, wherein the components of the elevator system comprise at least elongated members of the elevator system, and wherein determining the relationship between the characteristics of the sway of the building and the configuration of the elongated members of the elevator system includes using information regarding building design and building sway modes, using information regarding the configuration or features of the elongated members, establishing relationships between sets of characteristics of the sway of the building and resulting sway of the elongated members, and determining an expected sway of the elongated members based on the relationships; and controlling at least one of position and movement of an elevator car in the hoistway based on the expected sway of the elongated member and based on the determined relationship including using a first control strategy when the determined characteristics comprise a first set of characteristics or a second control strategy when the determined characteristics comprise a second set of characteristics, wherein the first set of characteristics is different than the second set of characteristics and the first control strategy is different than the second control strategy.

* * * * *